United States Patent
Jung et al.

(10) Patent No.: US 6,389,554 B1
(45) Date of Patent: May 14, 2002

(54) CONCURRENT WRITE DUPLEX DEVICE

(75) Inventors: Woo Sug Jung; Kwang Sug Song; Bo Sub Kwon, all of Taejeon (KR)

(73) Assignees: Electronics and Telecommunications Research Institute, Daejeon; Korea Telecom, Seoul, both of (KR)

( * ) Notice: Subject to any disclaimer, the term of this patent is extended or adjusted under 35 U.S.C. 154(b) by 0 days.

(21) Appl. No.: 09/210,522

(22) Filed: Dec. 11, 1998

(30) Foreign Application Priority Data

Dec. 17, 1997 (KR) .......................................... 97-69476

(51) Int. Cl.⁷ ................................................ G06F 11/00
(52) U.S. Cl. ............................... 714/6; 710/21; 714/11; 714/48
(58) Field of Search ............................. 714/6, 5, 8, 44, 714/11, 13, 14, 48, 820; 710/131, 20, 21, 15; 711/148

(56) References Cited

U.S. PATENT DOCUMENTS

| | | | |
|---|---|---|---|
| 4,371,754 A | * 2/1983 | De et al. ....................... | 179/18 |
| 4,453,215 A | 6/1984 | Reid .......................... | 364/200 |
| 4,797,903 A | * 1/1989 | Itoh ............................. | 375/40 |
| 4,933,846 A | * 6/1990 | Humphrey et al. .......... | 364/200 |
| 5,325,517 A | 6/1994 | Baker et al. ................. | 395/575 |
| 5,335,352 A | * 8/1994 | Yanai et al. .................. | 710/51 |
| 5,398,331 A | * 3/1995 | Huang et al. ............... | 395/575 |
| 5,544,347 A | 8/1996 | Yanai et al. ................. | 395/489 |
| 5,751,764 A | * 5/1998 | Meyer et al. ............... | 375/219 |
| 5,963,976 A | * 10/1999 | Ogawa et al. .............. | 711/148 |
| 6,134,624 A | * 10/2000 | Burns et al. ................ | 710/131 |

* cited by examiner

*Primary Examiner*—Thomas Lee
*Assistant Examiner*—Rijue Mai
(74) *Attorney, Agent, or Firm*—Cohen, Pontani, Lieberman & Pavane

(57) ABSTRACT

A concurrent write duplexing device with extension of memory bus according to the present invention includes: a primary memory having a first memory in which changed information is stored and a first memory controller for controlling the first memory; a secondary memory having a second memory in which the operating system is loaded to change an operation mode from the standby module to the active module upon failure of duplexing separation and a second memory controller for controlling the second memory; a bus transceiver part for exchanging data with a CPU through a system bus and having a bus transceiver in the first memory controller and a bus transceiver in the second memory controller, to thereby determine as to whether the first and second memory controller operate; and a memory switch part for exchanging data between the active module and the standby module and having memory switches which set direction of memory bus in accordance with an operation mode of module, so that write operation performed in the memory controller of the active module will be executed in the standby module with the same contents and a memory switch controller for controlling the memory switches.

6 Claims, 12 Drawing Sheets

| ACTIVE MODE | STANDBY MODE | STANDBY MODULE READ | MEMORY READ | OUTPUT | REMARKS |
|---|---|---|---|---|---|
| 1 | 0 | 0 | 0 | Dir_A, Dir_B, Dir_C = H<br>Enable_A, Enable_B, Enable_C = H | ACTIVE MODE, MEMORY AND SIMULTANEOUS WRITE |
| 1 | 0 | 1 | 0 | Enable_A, Enable_B = H | ACTIVE MODE, STANDBY MODULE MEMORY READ |
| 1 | 0 | 0 | 1 | Enable_A, Enable_C = H | ACTIVE MODE, MEMORY READ |
| 1 | 1 | 0 | 0 | Enable_A, Enable_C = H<br>Dir_A, Dir_C = H | NON-DUPLEXING MODE, MEMORY WRITE |
| 1 | 1 | 0 | 1 | Enable_A, Enable_C = H | NON-DUPLEXING MODE, MEMORY READ |

FIG. 8

<MEMORY AREA>

CONCURRENT WRITE DUPLEX DEVICE

BACKGROUND OF THE INVENTION

1. Field of the Invention

The present invention relates to a concurrent write duplexing device with extension of memory bus in a tightly coupled fault tolerance system, and more particularly, to a concurrent write duplexing device with extension of memory bus, to maintain memory data consistency within a duplexing operating processor module in a failure sensing control system.

2. Discussion of Related Art

Generally, all of systems which are manufactured by the adaptation of human being's technology always contain the possibility that various kinds of troubles caused due to their designers's mistake, failure of components and the like may occur. If, however, such the troubles occur in the system used for a specific purpose which should prevent the troubles, such as medical equipments, flight control systems, satellites, weapon systems, switching systems, a normal operation is impossible, which results in a serious problem. A fault tolerance system means a non-stop system in a system level which is constructed to operate in a designed order regardless of generation of hardware failure or software error. In the case where any trouble in the fault tolerance system occurs, the fault tolerance system fundamentally includes a redundancy module which can back up a system function and varies its own embodied method in accordance with the number and type of additional redundancy modules.

In case of encountering any fault in a switching system, the fault can be repaired at a proper time by an operator. Therefore, the switching system does not need a large amount of hardware redundancy which is required in the medical equipments, flight control systems, satellites, and weapon systems. Typically, the switching system is comprised of a module which executes a system function and a standby module which backs up the system function, which is embodied in a duplexing manner. The switching system which operates under high reliability and availability, supports a fault tolerancy function for some important parts in the duplexing manner. A control part as one of important parts in the switching system operates an active module for one portion and a standby module for the other portion by using the same processor module. In a preferred embodiment of the present invention, the data consistency of memory are kept to be same in the active module and the standby module, and if the fault is produced in the active module, the standby module receives only state information of the active module and changes its own state to be the state of the active module, so that the system can be operated in a non-stop manner in a system level. It is of course important that the data consistancy between the two modules should be maintained to be same as each other. To this end, therefore, a concurrent write method is embodied in the preferred embodiment of the present invention. With the concurrent write method which is applied in the fault tolerance system, a memory write operation in the active module which is implemented in the standby module to constantly maintain the same memory contents, and then if any fault occurs in the active module, the standby module executes the system function in the defective active module and continuously proceeds the function in the system level regardless of the fault in the active module.

Examples of the conventional duplexing devices in which the concurrent write method is embodied are a duplexing data channel matching device using a tightly coupled data transmission method and a duplexing data channel matching device using decoupled data transmission method. Since these devices are achieved by extension of a system bus and alteration of most hardware according to change of a central processing unit (CPU), i.e., the system bus, they exhibit low compatibility and should have a long period of time in driving the hardware development. With the improvement of the performance of the CPU, the conventional device is not useful due to clock increment of the system bus and does not ensure a reliable application in hundreds of MHz of a currently commercial high performance microprocessor. In addition, since the duplexing data channel matching device using the coupled data transmission method should receive answer signals from the two modules to proceed the next operation, the device exhibits serious performance deterioration. Meanwhile, although the duplexing data channel matching device using the decoupled data transmission method separates a memory write operation and a concurrent write operation in the active module by using a first-in first-out (FIFO) to thereby solve the performance deterioration in the duplexing data channel matching device using the coupled data transmission method, the device overcomes the troubles generated in a complicated manner and also exhibits a high fault generation probability.

Figure 1:
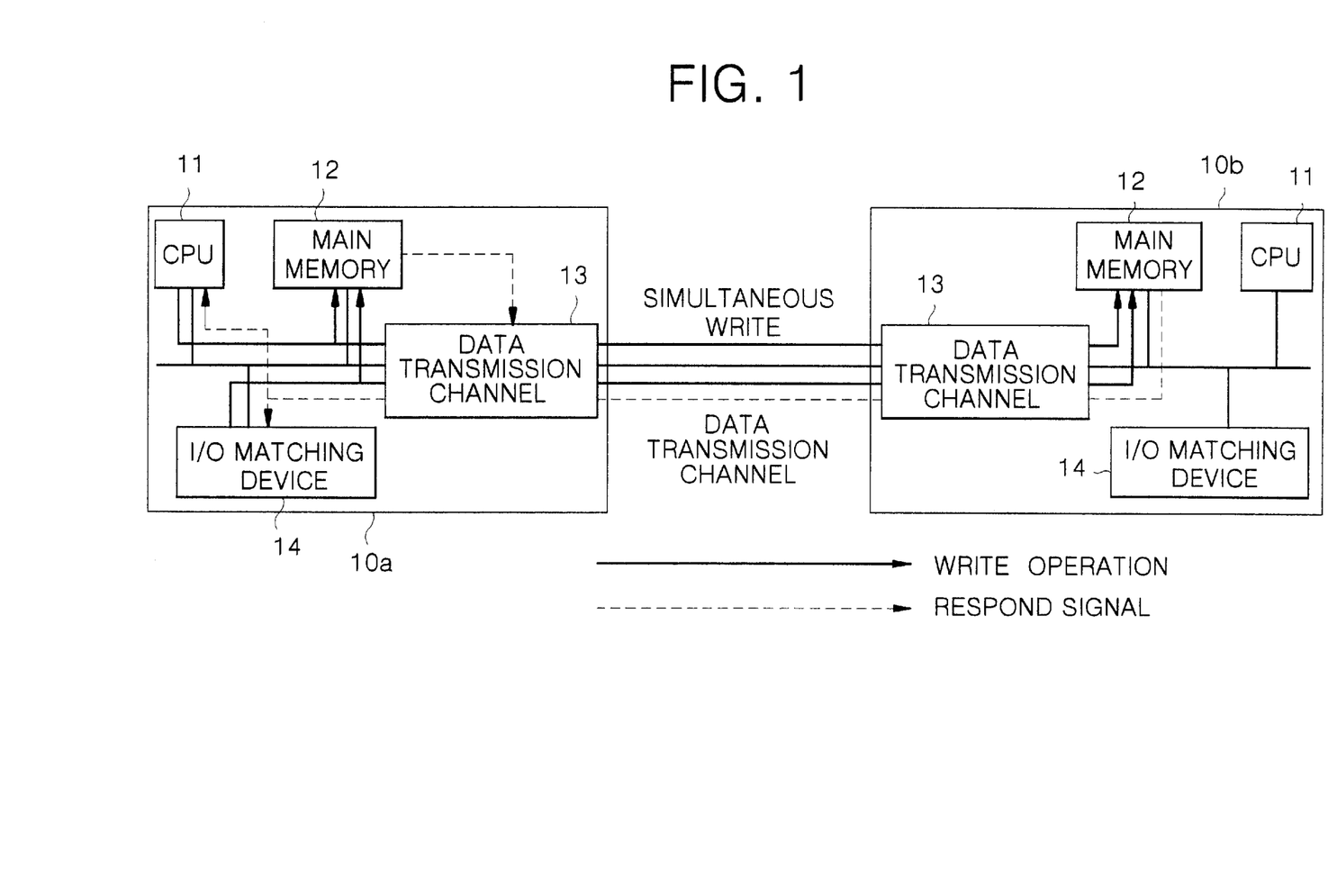
FIG. 1 is a block diagram illustrating a data transmission channel in which a conventional coupled data transmission in switching system is employed.

FIG. 1 is a block diagram illustrating a data transmission channel where a coupled data transmission system which does not separate a memory write operation and a concurrent write operation in an active module is employed, in a duplexing device in which a conventional concurrent write method is embodied.

As shown in the figure an active module 10a and a standby module 10b respectively include a central processing unit (CPU) 11, a main memory 12, a data transmission channel 13 and an input/output (I/O) matching device 14.

The solid line as shown in FIG. 1 indicates the memory write operation in the active module 10a which is executed to the main memory 12 by the CPU 11 or the I/O matching device 14, and the dotted line indicates an answer signal process to inform the CPU 11 or the I/O matching device 14 that specific data is stored to each main memory 12 of the active module 10a and the standby module 10b. In this case, for the duplexing operation, the main memory write operation in the active module 10a is extended to a local bus in the standby module 10b through the data transmission channel 13 to be thereby transmitted to the main memory 12 in the standby module 10b, such that the data in the main memory 12 within the active module 10a and the standby module 10b are constantly maintained to be same as each other. In the data transmission channel where the coupled data transmission method is employed, however, there occurs a problem that since an answer signal to write operation completion should be received from the main memory 12 of the standby module 10b to complete the write operation to a specific region of the corresponding main memory 12, no following operation can be executed before the answer signal is received from the standby module 10b.

Accordingly, the overhead caused due to the waiting time for the answer signal from the standby module forcibly renders system performance in the duplexing device in which the conventional coupled transmission system is employed to be deteriorated, such that the data transmission channel using the conventional coupled transmission system can not be well employed in the system having a high performance processor.

Figure 2A:
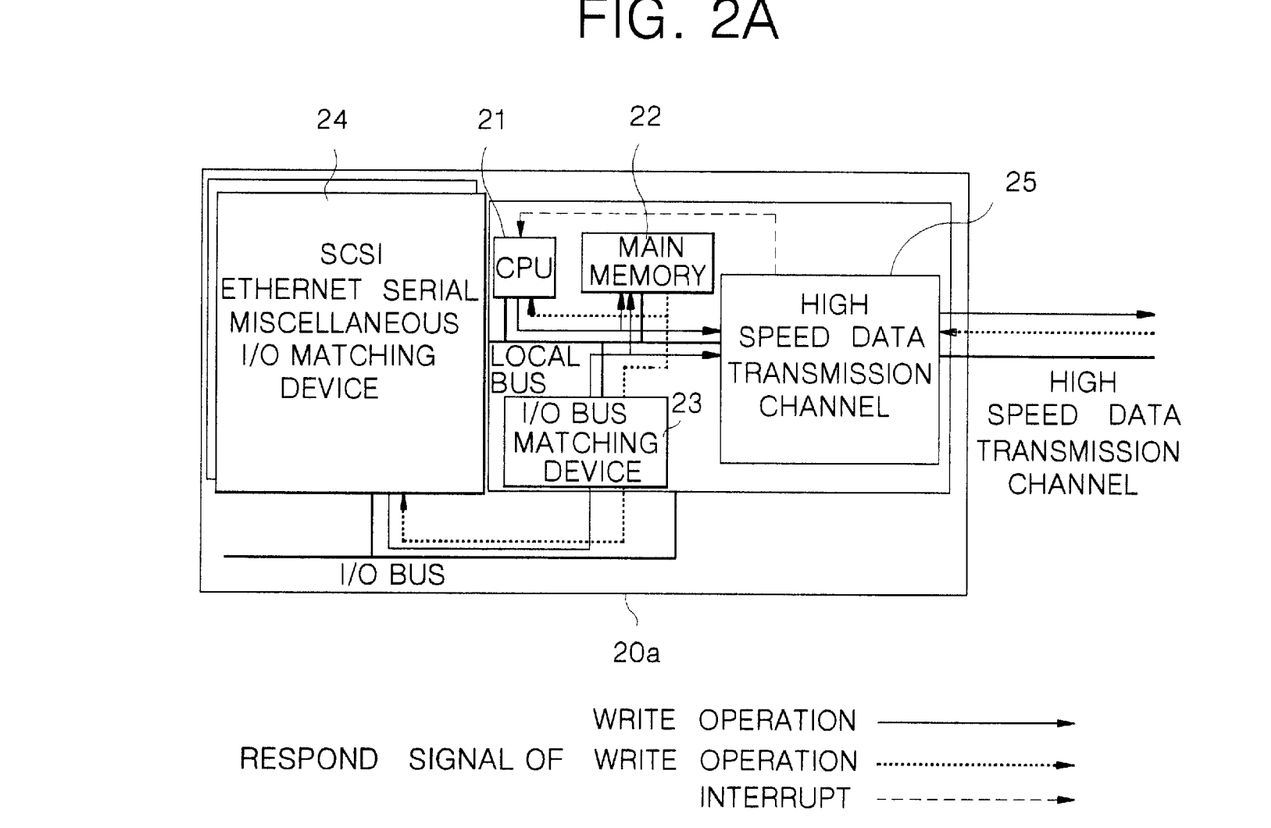
FIGS. 2A and 2B are block diagrams illustrating a data transmission channel in which a conventional decoupled data transmission in switching system is employed.
Figure 2B:
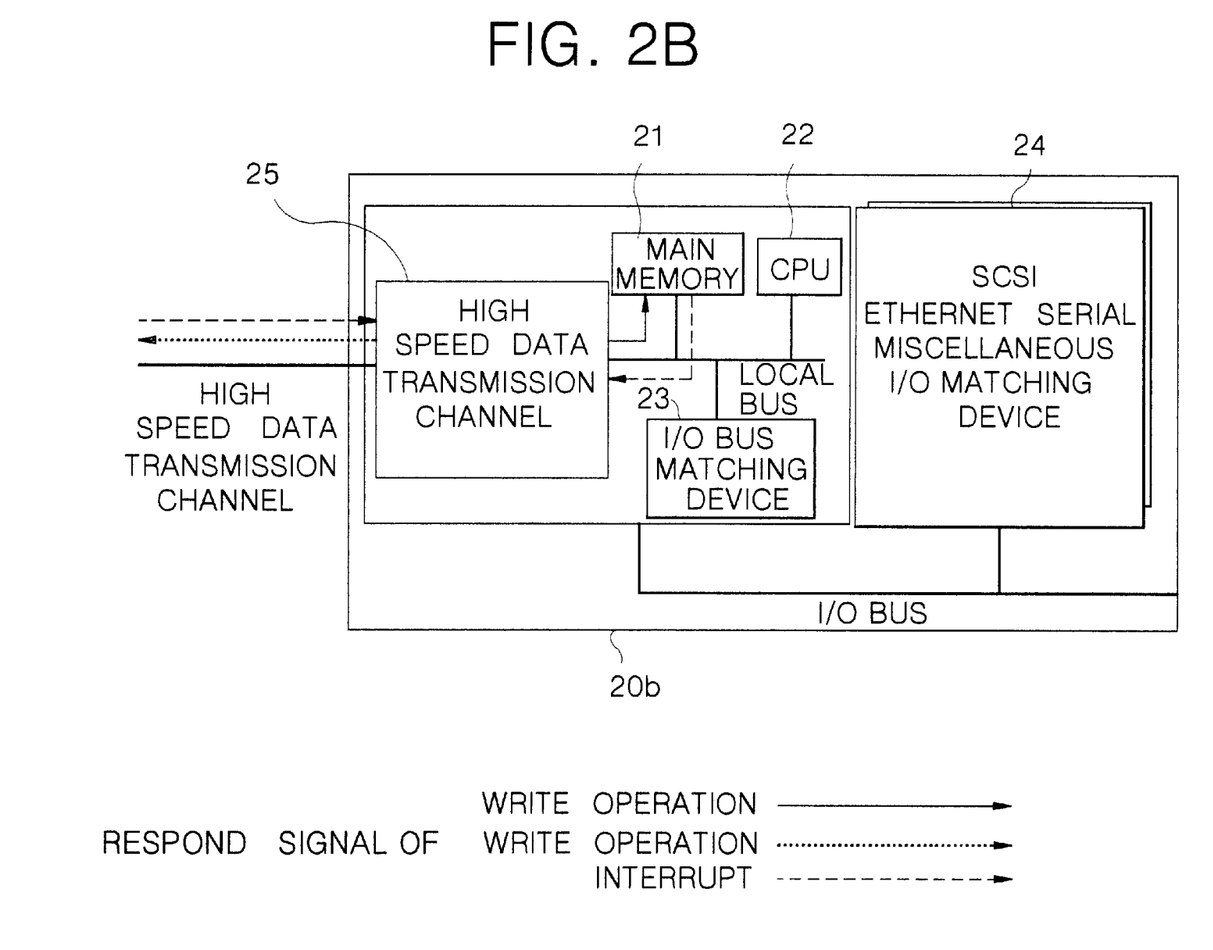

FIGS. 2A and 2B are block diagrams illustrating a data transmission channel in which a conventional decoupled data transmission system which is designed to minimize performance deterioration caused in FIG. 1 is employed, where a main memory write operation within an active module and a concurrent write as a main memory write operation within a standby module through a data transmission channel are independently separated and operated.

As shown in the figure, an active module 20a and a standby module 20b respectively include a central processing unit (CPU) 21, a main memory 22, an input/output (I/O) bus matching device 23, an SCSI Ethernet, miscellaneous I/O matching device 24, and a high speed data transmission channel 25. Further, a buffer for separating the operation in the two modules is disposed in the interior of each of the modules. However, in the conventional decoupled data transmission system, there occurs a problem that various troubles may be produced in accordance with the complication of hardware and increment of electronic parts caused due to the operation separation of the two modules. In addition, since the operation where the fault occurs has been already completed by the CPU 21, it is difficult to find and recovery the part in which the fault has occurred. Also, in the case where the trouble occurs during duplexing separation of system, it is impossible to overcome the fault. Meanwhile, it is understood that the decoupled data transmission system where a corresponding operation in the memory write operation of the CPU is monitored and the monitored data is stored in the buffer is not desirable because the time for sensing the corresponding operation is shortened due to the high speed system bus. Specifically, the system can not be embodied in a high performance microprocessor having a high speed system bus.

Current commercial high performance microprocessor provides several hundreds MIPS (Million Instruction Per Second) performance, based upon hundreds of MHz of clocks, and uses upper 100 MHz of system bus clock to solve system bottle-neck which is generated in the system bus, which will be increased. However, since the embodiment of the conventional duplexing fault tolerance system using the concurrent write is achieved by extending the system bus, there still remains a problem that if the system bus clock is increased, the system can not be embodied appropriately. Also, since the alteration of hardware associated with the duplexing device is accompanied in accordance with upgrade and change of the CPU, it requires a long period of time to develop new hardware and software.

SUMMARY OF THE INVENTION

Accordingly, the present invention is directed to a concurrent write duplexing device with extension of memory bus in a tightly coupled fault tolerance system that substantially obviates one or more of the problems due to limitations and disadvantages of the related art.

An object of the invention is to provide a concurrent write duplexing device with extension of memory bus in a tightly coupled fault tolerance system which can extend the memory bus between a memory controller and a memory which has a feature of a lower speed less than a system bus and is regardless of the change of CPU and connects the extended bus to a duplexing data channel.

Preferably, the duplexing device of the present invention in which the memory bus is extended is achieved by a minimum hardware and should meet basic requirements as follows:

1) a memory switch for connecting data channel which maintains data consistency of active/standby processor modules to be same as each other, 2) a memory switch control function for setting a memory switch direction by performing memory read, write, and concurrent write, 3) a function for setting active/standby operation modes and determining a channel hang-up mode, and 4) a minimum hardware occupation for minimizing fault occurrence probability caused due to increment of hardware components.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the drawings.

In the drawings.

DETAILED DESCRIPTION OF PREFERRED EMBODIMENTS

Reference will now be made in detail to the preferred embodiments of the present invention, examples of which are illustrated in the accompanying drawings.

A concurrent write duplexing device of the present invention utilizes a standard memory bus in a concurrent write method. The duplexing device of the present invention reduces a hardware developing period by minimizing alteration of the hardware and can be preferably embodied regardless of type of CPU and a high speed system bus, because the speed of memory bus depends upon access time of DRAM. In addition, the duplexing device of the present invention can be embodied under simple hardware construction in which data path controlled by using a memory switch and a register for controlling the data path softwarily are arranged.

An explanation of the duplexing device according to an embodiment of the present invention will be in detail discussed.

Figure 3:
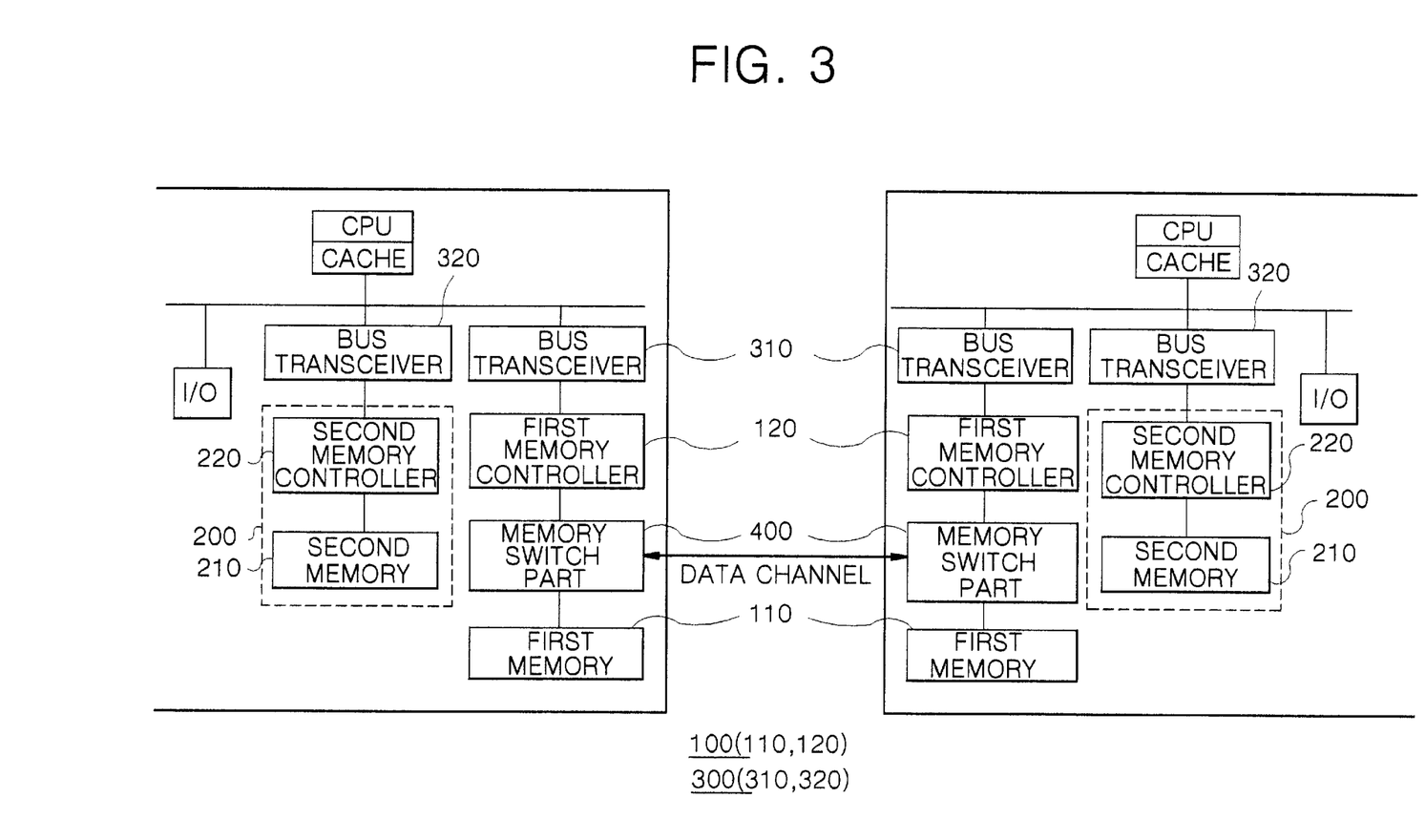
FIG. 3 is a block diagram illustrating duplexing construction in a processor module using a concurrent write duplexing device achieved by extending a memory bus according to one embodiment of the present invention.

FIG. 3 shows duplexing construction in a processor module using a concurrent write duplexing device achieved by extending a memory bus according to one embodiment of the present invention. The speed of memory bus depends upon the access time of DRAM regardless of the clock of system bus, and since the access time of DRAM is a minimum 60 ns, which corresponds to about 16.7 MHz or more, hardware construction is made in a simple manner. Furthermore, since the write operation which is performed in a memory controller within an active module is executed in a standby module with the same data content through the memory switch, the duplexing device of the present invention can sense a fault generated and retries the operation where the fault has been generated to thereby recover the fault.

The conventional concurrent write duplexing devices are achieved by extending the system bus, and contrarily, the concurrent write duplexing device of the present invention is accomplished by extending the memory bus (hereinafter, simply referred to as "concurrent write duplexing device with extension of memory bus"). The clock of system bus is relatively raised, because a large number of masters use the system bus, and accordingly protocol is complicated. However, the memory bus is at a lower speed than system bus and in an asynchronous system, because only the memory controller reads and writes data on the memory, and accordingly the protocol is simple. As shown in the Figure, operating system (OS) and application programs are loaded to maintain the data consistency between the active module and the standby module. In construction, the concurrent write duplexing device of the present invention includes: a primary memory 100 having a first memory 110 in which changed information is stored and a first memory controller 120 for controlling the first memory 110; a secondary memory 200 having a second memory 210 in which the operating system is loaded to change an operation mode from the standby module to the active module upon failure of duplexing separation and a second memory controller 220 for controlling the second memory 210; a bus transceiver part 300 for exchanging data with a CPU through a system bus and having a bus transceiver 310 which is connected to the first memory controller 120 and bus transceiver 320 to the second memory controller 220, to thereby determine as to whether the first and second memory controller 120 and 220 operate; and a memory switch part 400 for exchanging data between the active module and the standby module and having memory switches 410 to 430 which set direction of memory bus in accordance with an operation mode of module, so that write operation performed in the memory controller of the active module will be executed in the standby module with the same contents and a memory switch controller 440 for controlling the memory switches 410 to 430.

In the concurrent write duplexing device with extension of memory bus according to the present invention, the memory bus between the active and standby modules is connected through the memory switch part 400, and the memory is divided into the first and second memories 110 and 210. The memory switch part 400 serves to set the direction of the memory bus in accordance with an operation mode of the two modules, and the first memory 110 is a general memory, in which the operating system and application program are loaded and changed data contents are stored. The second memory 210 is a memory for providing the service to an input/output part of the standby module during the duplexing operation, in which only the operating system is loaded. If the duplexing operation fails, the module for changing the operation mode from the standby module to the active module continually provides the service by using the operating system of the second memory 210. At the time, a momentary stop of the service may be generated. This time is less than 30ms.

In the case where the duplexing device with the extension of memory bus includes one memory (if the secondary memory 200 does not exist), if the CPU of the active module and the CPU of the standby module approach to the memory at the same time, a memory bus arbitrator for determining a priority of the approach to the memory should be additionally included. However, the installation of the memory bus arbitrator is difficult due to refresh cycle of memory, memory bus arbitration and the like.

To solve this problem, the duplexing device with the extension of memory bus according to one embodiment of the present invention is comprised of the first memory 110 for maintaining data consistency between the active and standby modules and the second memory 210 for providing I/O service to the standby module. Also, the bus transceivers 310 and 320 serve to determine whether or not the first memory controller 120 and the second memory controller 220 operate in accordance with the operation mode of the modules. If the duplexing operation is not executed, the refresh cycle of DRAM is performed in the first and second memory controllers 120 and 220 of each module. However, if the operation mode is changed to the duplexing operation, the memory controller of the active module has a function of refreshing its own memory and simultaneously refreshing the memory of the standby module. In case of duplexing separation caused due to occurrence of trouble, the register within the CPU and cache contents are stored in the first memory of the active module and are simultaneously transmitted to the first memory of the standby module through the data channel. Then, the refresh cycle is executed through the whole area of memory. The standby module succeeds to the system function first performs the refresh operation through the whole area of its own memory before it is changed to the active operation mode, to thereby complete the duplexing separation. The refresh cycle is adjustable through an internal register of common memory controller.

FIGS. 4A to 4E are operational diagrams illustrating mode operation states of the memory switch in the concurrent write duplexing device achieved by extending the memory bus according to the present invention.

Figure 4A:
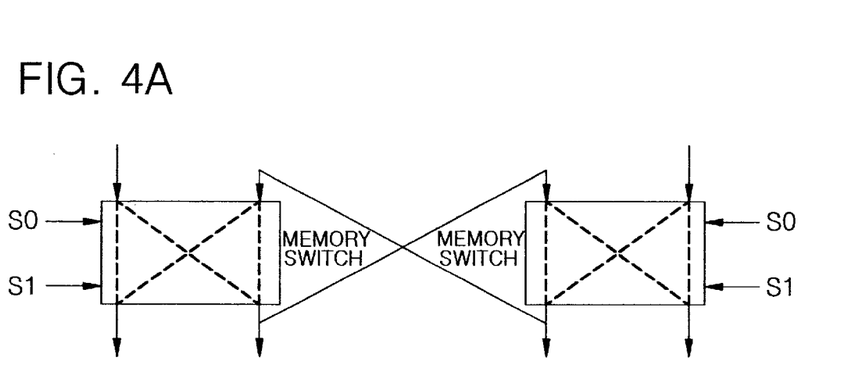
FIGS. 4A to 4E are operational diagrams illustrating mode states of the memory switch in the concurrent write duplexing device achieved by extending the memory bus according to the present invention.
Figure 4B:
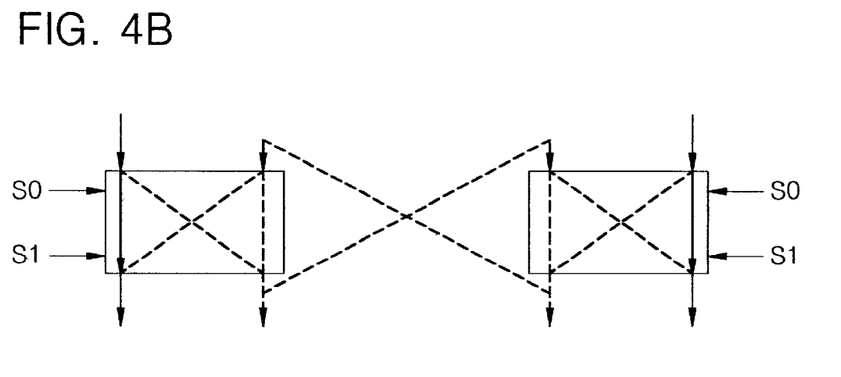

Each rectangle represents a memory switch, and the line within the rectangle indicates data path within the switch, in which the solid line denotes the data path which is currently operated and the dotted line denotes the data path which is not currently operated. In the figure, the memory switch in the left portion is within the active module, during the duplexing operation mode. FIG. 4A shows a general operation state of the two memory switches. The operation state of the memory switch is divided into four mode states as follows:

FIG. 4B shows an initial mode of the memory switches. In this case, the memory switches operate individually, not being in a duplexing operation mode, to which an initial power supply is applied. The memory switches connect data channel to read and write the data in their own memories.

Figure 4C:
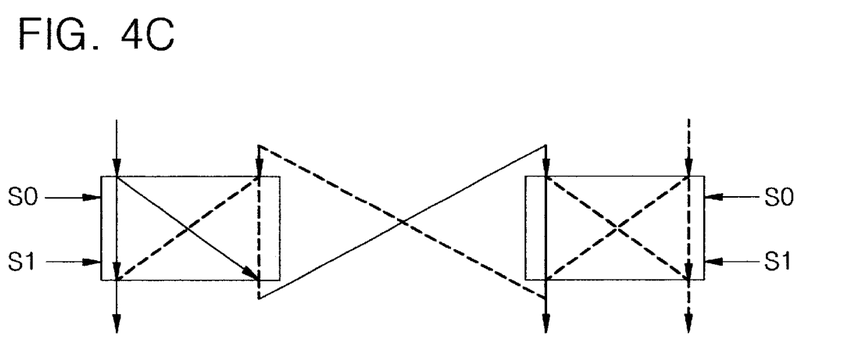

FIG. 4C shows the duplexing operation mode (left rectangle indicates the memory switch in the active module) and concurrent write. The mode is used for maintaining the data consistency between the two modules to be same as each other. In case of performing write operation to the memory of active module, a path establishing operation is executed to send the write operation to the first memory of the standby module.

Figure 4D:
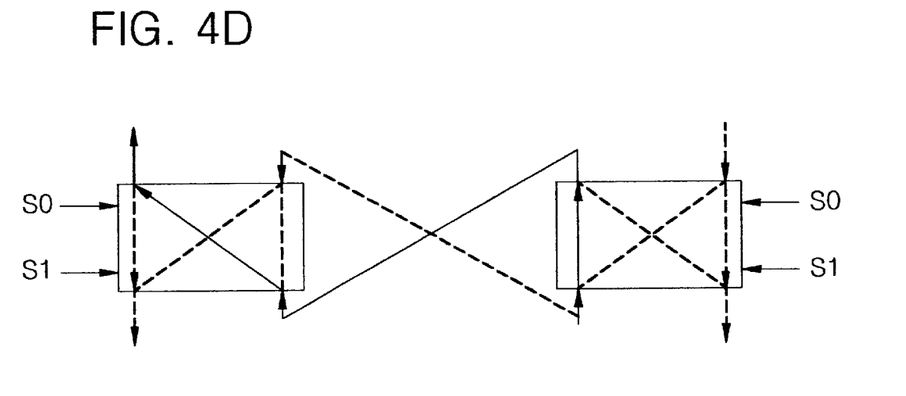

FIG. 4D shows the duplexing operation mode (left rectangle indicates the memory switch in the active module) and memory read of the standby module. The mode is used for checking whether the data contents sent to the standby module is the same as the active module, by concurrent write. The operation detects the fault which has been not detected through a fault transaction code such as parity and ECC (Error Correcting Code).

Figure 4E:
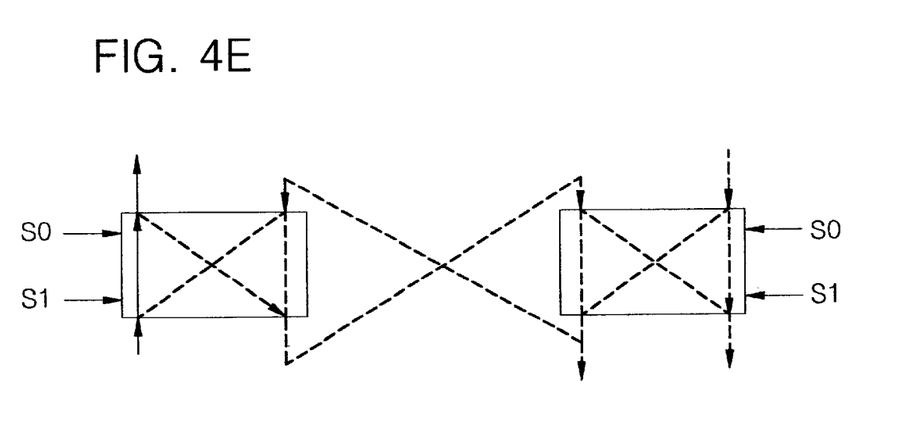

FIG. 4E shows the memory read state in the active mode and non-duplexing operation separation mode. The operation state is used to read the memory contents of the active module during the duplexing operation and can be actually operated regardless of the duplexing operation mode.

Figure 5:
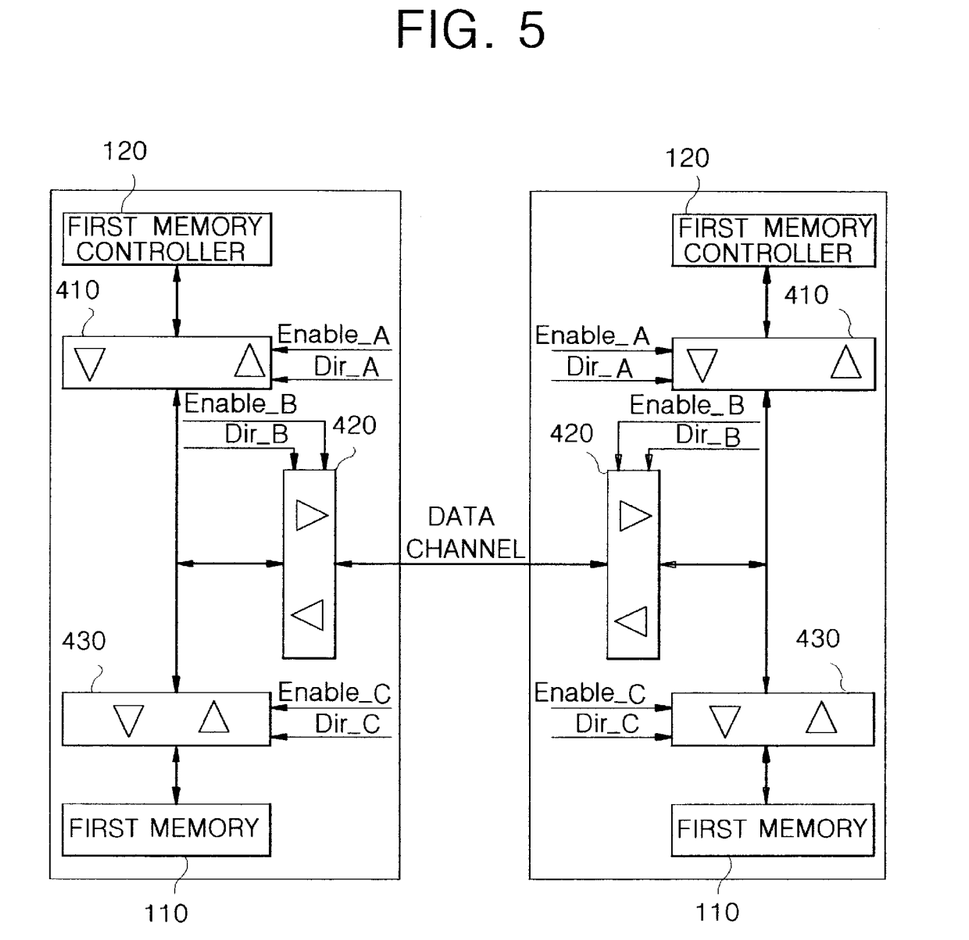
FIG. 5 is a block diagram illustrating circuit construction of the memory switch part in the concurrent write duplexing device achieved by extending a memory bus according to the present invention.

FIG. 5 is a block diagram illustrating circuit construction of the memory switch part 400 in the concurrent write duplexing device achieved by extending memory bus according to the present invention.

The memory switch part 400 comprises the active module memory switch 410, the concurrent write memory switch 420, the first memory bus switch 430, and the memory switch controller 440. A detailed explanation of construction of the memory switches 410 to 430 will be given with reference to FIG. 5. The structure of memory switch controller 440 will be shown in FIG. 6.

The memory switch part is used for setting data path between the two modules and is easily embodied by using three bidirectional bus transceivers(or by using multiplexer (MUX)). In case of the active module, the memory switch part includes the active module memory switch 410 for separating the memory controller 120 and the first memory 110, the concurrent write memory switch 420 for performing concurrent write from the active module to the standby module through the data channel, and the first memory bus switch 430 for performing the memory operation to the first memory 110, regardless of the active module and the standby module.

The operation mode is determined by the memory switch controller 440, and control signals "Enable_A", "Dir_A", "Enable_B", "Dir_B", "Enable_C", and "Dir_C" for controlling the active module memory switch 410, the concurrent write memory switch 420, and the first memory bus switch 430 are received from the memory switch controller 440 to thereby set transmission direction of the memory bus and data channel.

The active module memory switch enable signal "Enable_A" is generated to enable the active module memory switch, in case where the operation mode of memory switch is the active mode or an initial operation mode. The signal "Enable_A" is inactive and disconnects the memory bus between the memory controller and the first memory, if the operation mode is the standby mode. The direction control signal "Dir_A" is produced to change the direction of the active module memory switch in accordance with read and/or write operation executed in the memory controller, if the active module memory switch is in an enable state. If the read operation is executed, the direction of the active module memory switch is set to transmit the data from the memory controller to the first memory, and contrarily, if the write operation is executed, the direction thereof is set to receive the data from the memory controller to the first memory. The control signal "Enable_B" is the enable signal of the concurrent write memory switch and the control signal "Dir_B" is the signal for controlling the direction of the concurrent write memory switch. In more detail, the signal "Enable_B" is produced to connect the data channel between the active and standby modules to maintain the data consistency therebetween through the concurrent write, and the signal "Dir_B" is the direction set signal of the memory switch. The signals "Enable_C" and "Dir_C" are generated to control the memory bus switch for connecting the first memory and the active module memory switch. In more detail, the control signal "Enable_C" is the enable signal of the first memory bus switch, and in case of the initial mode or active mode, it allows the memory controller 120 to access the first memory 110. The control signal "Dir_C" is the signal for setting the direction of the first memory bus switch to thereby read and write the data on the first memory. All of the control signals are generated from the memory switch controller 440 as shown in FIG. 6.

Figure 6:
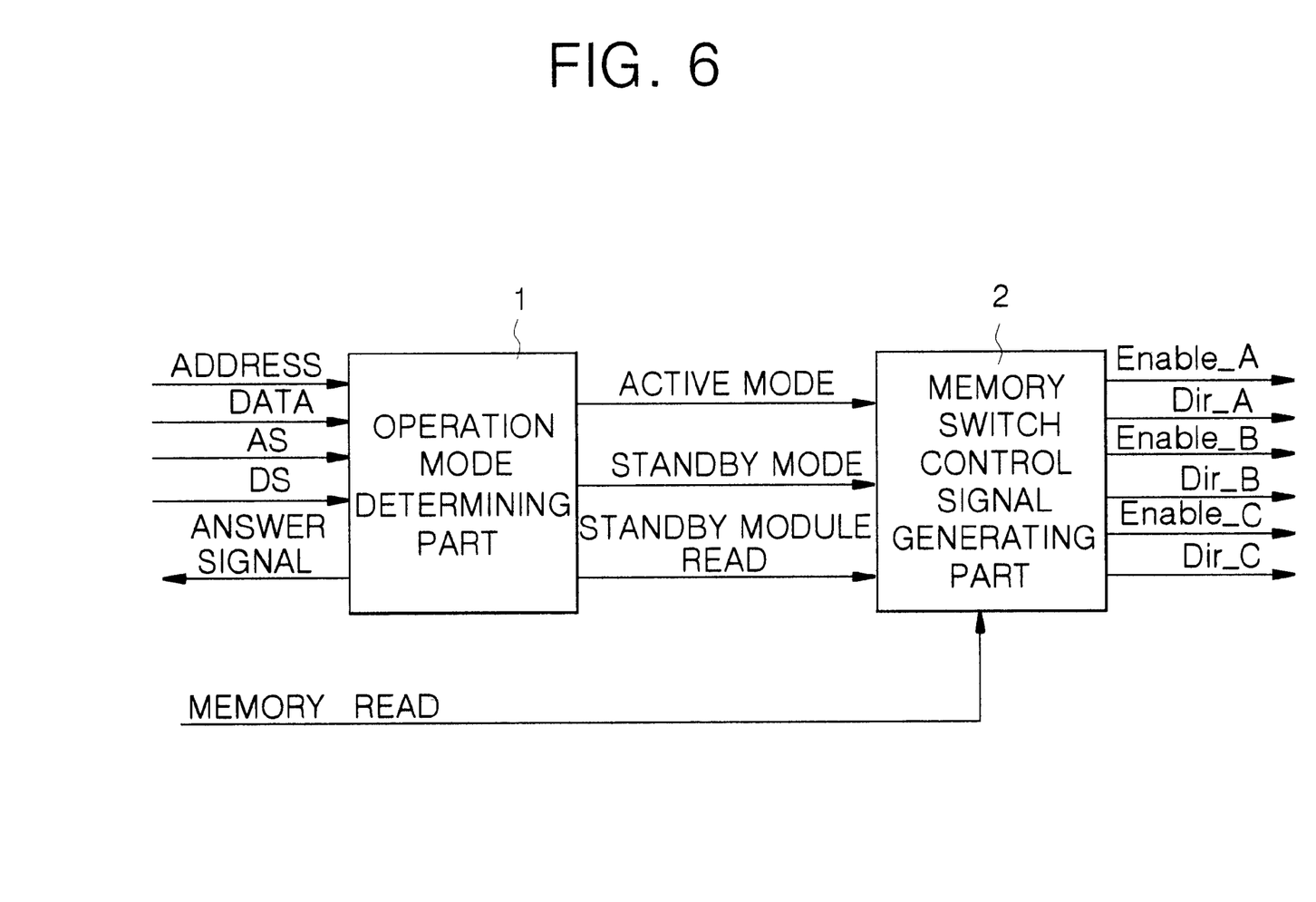
FIG. 6 is a block diagram illustrating an internal construction of the memory switch controller in the concurrent write duplexing device achieved by extending a memory bus according to the present invention.

FIG. 6 is a block diagram illustrating an internal construction of the memory switch controller 440 in the concurrent write duplexing device according to the present invention. To prevent the memory switch controller 440 from being changed, even if the CPU is changed, the controller 440 interfaces with PCI bus as a standard bus. The memory switch controller 440 is divided into an operation mode determining part 441 and a memory switch control signal generating part 442. The operation mode determining part 441 determines the operation of processor module and upon application of initial power to read the memory content of the standby module, produces control signals "active mode" and "standby mode" to determine the operation mode of the processor module and a control signal "standby module read" to check as to whether data associated with the concurrent write is normally sent to the memory of the standby module. These signals are generated by setting or clearing corresponding bits of an internal register within the operation mode determining part 441 through the CPU. Since the memory switch is set at an initial state to be operated in a memory write direction, it should be changed to the memory read direction to thereby perform the memory read operation. A signal "memory read" is received from the memory controller to execute the memory read. The memory switch control signal generating part 442 serves to generate control signals which control the direction of the memory switch in accordance with the control signals "active mode", "standby mode", "standby module read" received from the operation mode determining part 441 and the control signal "memory read" received from said memory controller 110. The control signal "Enable_A" is an active module memory switch enable signal, "Enable_B" is a concurrent write memory switch enable signal, and "Enable_C" is a first memory bus switch enable signal. The data path is determined in accordance with active/inactive state of the control signals generated from the memory switch control signal generating part 442. Meanwhile, the control signal "Dir_A" is an active module memory switch direction determining signal, "Dir_B" is a concurrent write memory switch direction determining signal, and "Dir_C" is a first memory bus switch direction determining signal. If the signal level is in the logic "H (high)" state, the memory write operation direction is determined and to the contrary, if in the logic "L (low)" state, the memory read operation direction is determined.

Figure 7:
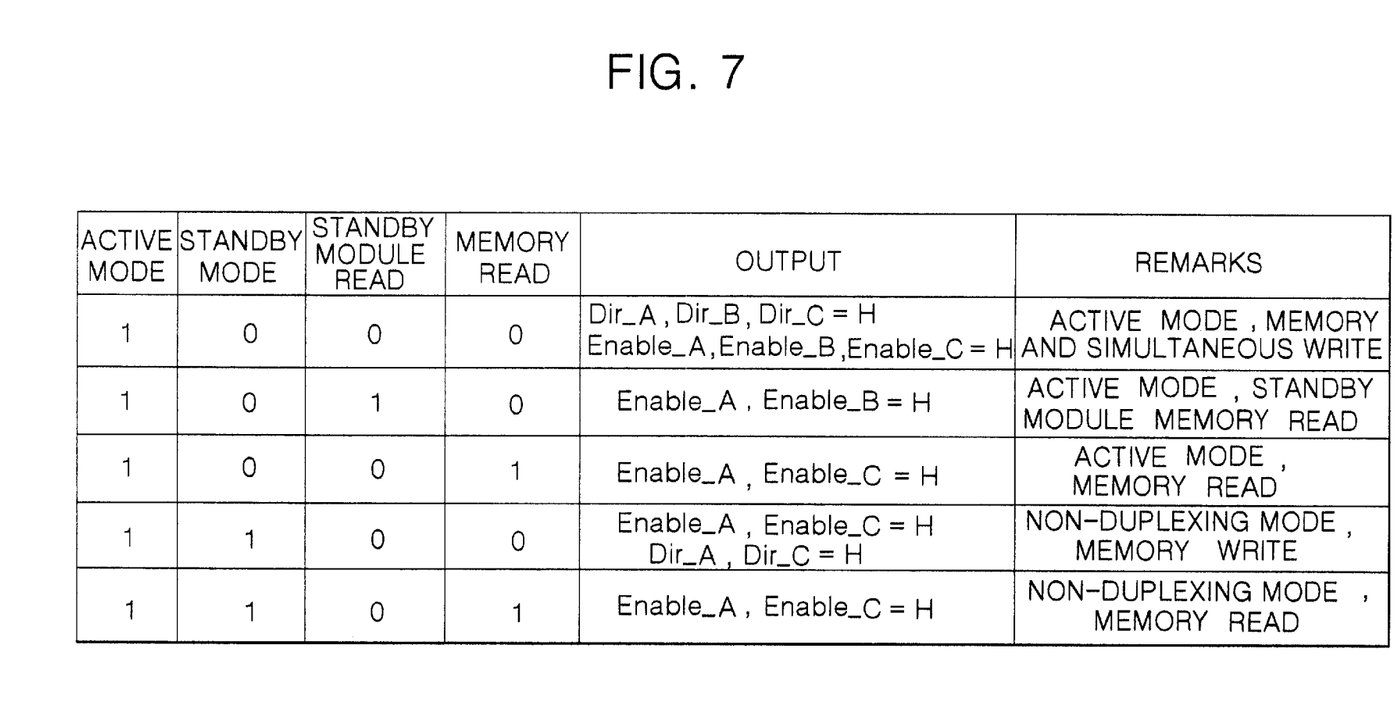
FIG. 7 is a truth table of a memory switch control signal generating part in a memory switch address signal generating circuit according to each operation in the concurrent write duplexing device achieved by extending a memory bus according to the present invention.

FIG. 7 is a truth table of a memory switch control signal generating part in a memory switch address signal generating circuit according to each operation in the concurrent write duplexing device achieved by extending a memory bus according to the present invention. The memory switch control signal generating part is easily embodied by using a decoder or 4×6 MUX on the basis of the truth table.

As shown in FIG. 7, referring to each bit value of the active mode, standby mode, standby module read and memory read in the truth table according to a preferred embodiment of the memory switch address signal generating circuit, five cases are given as follows:

1) in case where the bit value of only the active mode is "1" and the bit values of the rest of mode operations are "0", the active module memory switch 410, the concurrent write memory switch 420, and the first memory bus switch 430 are all in the enable state, and the memory write signal is generated to perform the concurrent write in the active mode;

2) in case where the bit values of only the active mode and the standby module read are "1" and the bit values of the rest of mode operations are "0", the active module memory switch 410 and the concurrent write memory switch 420 are in the enable state, and the standby module memory read is executed in the active mode;

3) in case where the bit values of only the active mode and the memory read are "1" and the bit values of the rest of mode operations are "0", the active module memory switch 410 and the first memory bus switch 430 are in the enable state, and the memory read is executed in the active mode;

4) in case where the bit values of only the active mode and the standby mode are "1" and the bit values of the rest of mode operations are "0", the active module memory switch 410 and the first memory bus switch 430 are in the enable state, and the memory write signal is generated to perform the memory write in the non-duplexing mode; and 5) in case where the bit value of only the standby mode is "0" and the bit values of the rest of mode operations are "1", the active module memory switch 410 and the first memory bus switch 430 are in the enable state, and the memory read is executed in the non-duplexing mode.

Figure 8:
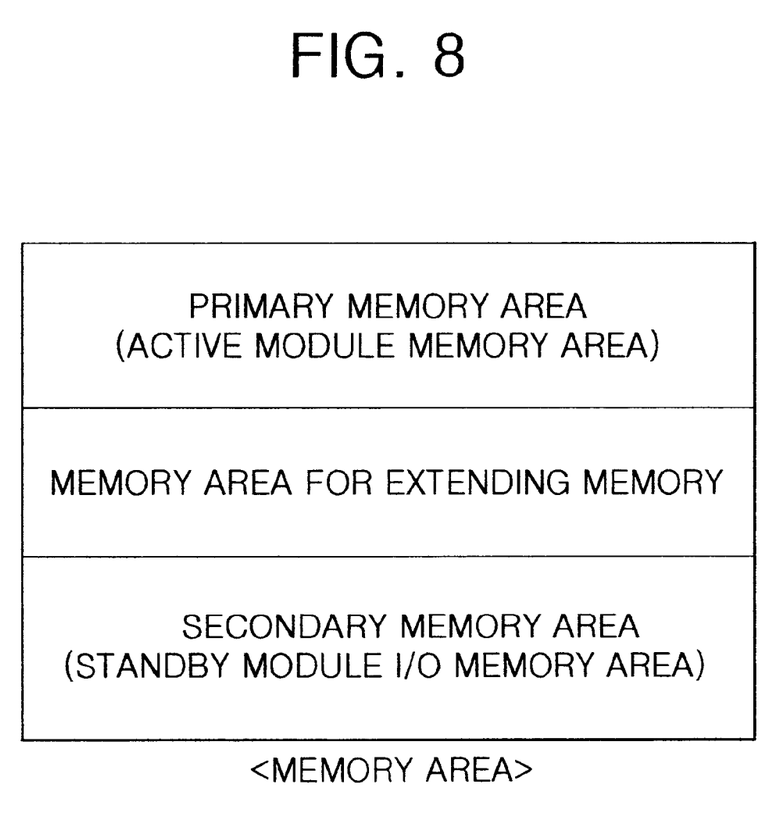
FIG. 8 is a mapping diagram illustrating the memory in the concurrent write duplexing device achieved by extending a memory bus according to the present invention.

FIG. 8 is a mapping diagram illustrating the memory in the concurrent write duplexing device achieved by extending a memory bus according to the present invention. The memory map is divided into a primary memory area 1, memory area 2 for extending the memory, and a secondary memory area 3. The primary memory area 1 is occupied to maintain data consistency to perform a duplexing function. The secondary memory area 3 is occupied to implement the operation related to I/O device generated from the standby module and receives a copy of OS from the active module before the duplexing operation mode to kept the received copy in the second memory. If the duplexing separation is not normally formed due to generation of an unexpected trouble, the memory contents in the primary memory area 1 are discarded and the OS stored in the secondary memory area 3 is copied in the primary memory area 1, so that the system retries the operation where the trouble has occurred at the OS level to thereby prevent the two modules from being under dual down state. The memory area 2 will be occupied for extension of the memory which may be caused due to the variation of size of further application program.

Figure 9A:
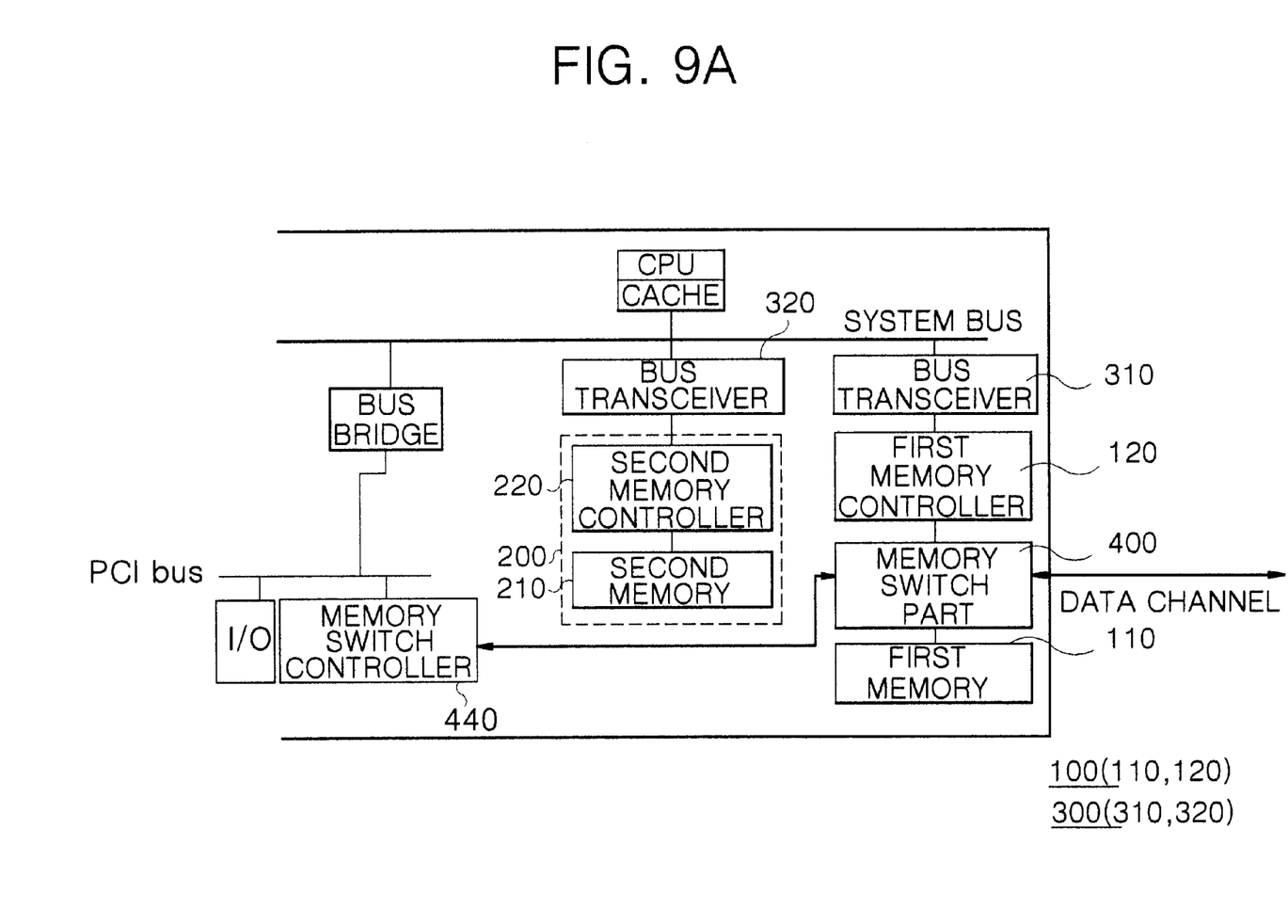
FIGS. 9A and 9B are block diagrams illustrating a duplexing construction in a processor module using a concurrent write duplexing device achieved by extending a memory bus according to another embodiment of the present invention.
Figure 9B:
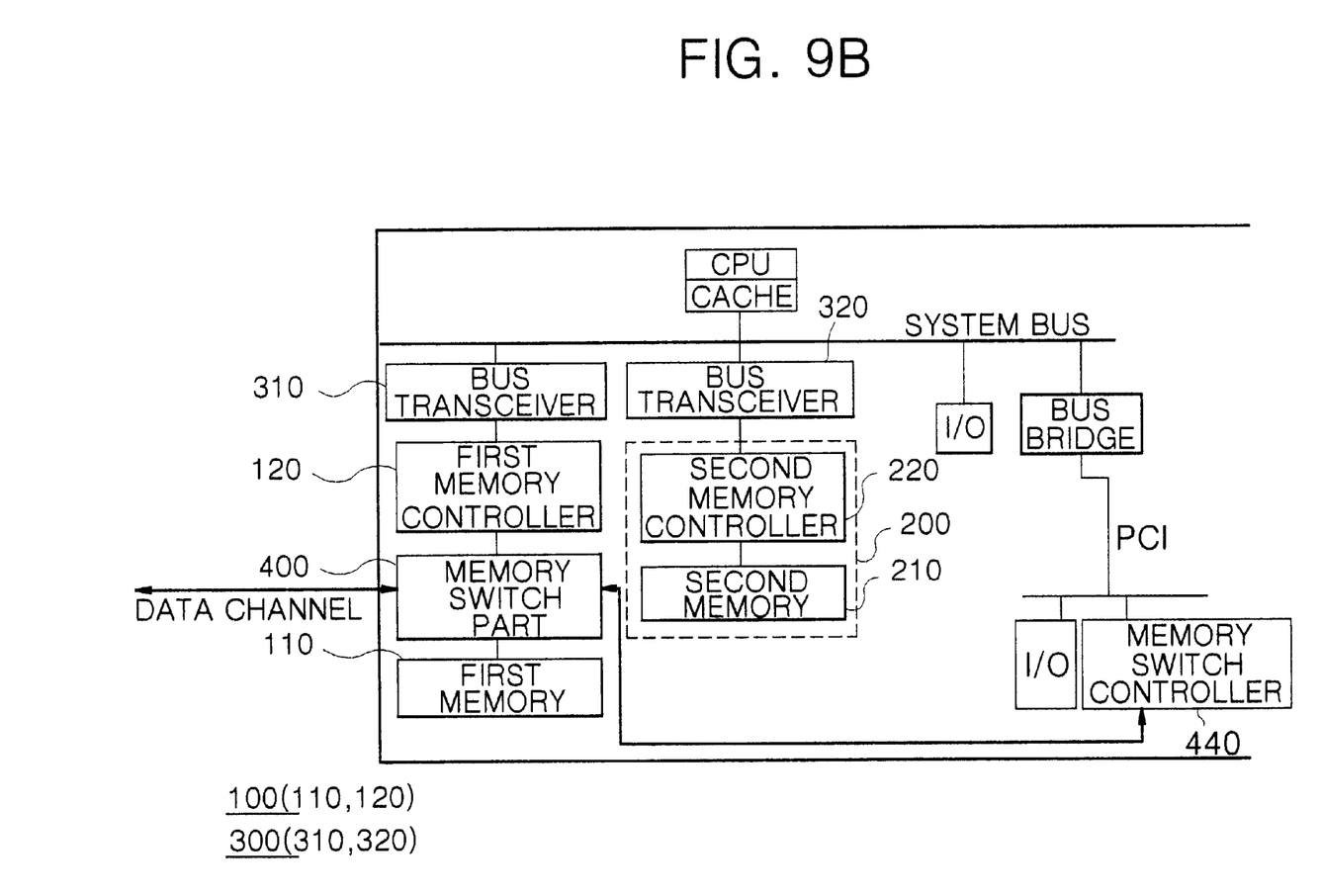

FIGS. 9A and 9B are block diagrams illustrating a duplexing construction in a processor module using a concurrent write duplexing device achieved by extending a memory bus according to another embodiment of the present invention.

As shown in the figures, the memory switch controller 440 is separately disposed from the memory switches 410 to 430 and can be exchanged individually. Also, the memory switch controller 440 matches with the PCI bus as a standard bus via a bus bridge, and if the CPU is changed, can be used without being exchanged with new one.

As clearly apparent from the foregoing, unit coupled duplexing construction in a high performance processor module device can be applicable in fault tolerance systems such as, for example, switching systems, communication control systems based upon high reliability and availability of very high speed communication network, server fault tolerance computer systems and the like. In addition, in a conventional processor module having hundreds of MHz of a high performance microprocessor and a system bus using a high frequency bus clock, a few hardware parts such as memory switches and a memory switch controller are required to construct the duplexing device according to the present invention. Furthermore, since alteration of hardware due to change of the processor is not a little required, development of a duplexing device can be achieved for a short period.

It will be apparent to those skilled in the art that various modifications and variations can be made in a concurrent write duplexing device with extension of memory bus in a tightly coupled fault tolerance system of the present invention without departing from the spirit or scope of the invention. Thus, it is intended that the present invention cover the modifications and variations of this invention provided they come within the scope of the appended claims and their equivalents.

What is claimed is:

1. A concurrent write duplexing device with extension of memory bus in a tightly coupled fault tolerance system which has active and standby modules for performing real time of service supply and, if any fault in the active module occurs, changes the standby module to be in an active operation mode to continually perform a control function thereof, by maintaining memory contents between the active module and the standby module to be same as each other, wherein each of said active module and said standby module has said duplexing device, said device comprising:

a primary memory having a first memory in which operating system and application program are loaded to maintain data consistency between the active module and the standby module and changed information is stored and having a first memory controller for controlling said first memory;

a secondary memory having a second memory in which the operating system is loaded to execute an input/output of the standby module during an duplexing operation and to change an operation mode of the standby module to the active module upon failure of duplexing separation and having a second memory controller for controlling said second memory;

a bus transceiver part for exchanging data with a CPU through a system bus and bus transceivers each installed in said first memory controller and said second memory controller to determine as to whether said first and second memory controller operate; and a memory switch part for exchanging data between the active module and the standby module and having memory switches which set direction of memory bus in accordance with an operation mode of module, so that write operation performed in said memory controller of the active module will be executed in the standby module with the same contents and a memory switch controller for controlling said memory switches.

2. The device as defined in claim 1, wherein said primary memory and said secondary memory each have a memory map in which primary memory area, secondary memory area and memory area for extending memory are occupied, said primary memory area maintaining data consistency to perform the duplexing operation, said secondary memory area implementing the operation related to an I/O device generated from the standby module, receiving a copy of OS from the active module before the duplexing operation mode to kept the received copy therein, discarding the memory contents in said primary memory area if the duplexing separation is not normally formed, and copying the stored OS on said primary memory area to thereby retry the system, and said memory area prepared for extension of the memory which may be caused due to the variation of size of further application program.

3. The device as defined in claim 1, wherein said memory switch part is comprised of:

the active module memory switch for separating said memory controller and said first memory, in case of an active module;

the concurrent write memory switch for performing concurrent write from the active module to the standby module through data channel;

the first memory bus switch for performing a memory operation to said first memory, regardless of the active module and the standby module; and the memory switch for controlling said memory switches.

4. The device as defined in claim 3, wherein said memory switch controller comprises:

an operation mode determining part for determining the operation of processor module by producing control signals "active mode", "standby mode" and "standby module read" to check as to whether data associated with the concurrent write is normally sent to the memory of the standby module, by receiving data from the CPU through said bus transceiver part and upon application of initial power, for determining the operation mode of the processor module to read the memory content of the standby module; and a memory switch control signal generating part for generating control signals which control the direction of the memory switch in accordance with the control signals "active mode", "standby mode", "standby module read" received from said operation mode determining part and the control signal "memory read" received from said memory controller.

5. The device as defined in claim 4, wherein said memory switch control signal generating part permits said active module memory switch, said concurrent write memory switch, and said first memory bus switch to be all in the enable state, and produces a memory write signal to perform concurrent write in the active mode, in case where bit value of only the active mode is set and bit values of the rest of mode operations are cleared;

in case where the bit values of only the active mode and the standby module read are set and the bit values of the rest of mode operations are cleared, permits said active module memory switch and said concurrent write memory switch to be in the enable state, and performs the standby module memory read in the active mode;

in case where the bit values of only the active mode and the memory read are set and the bit values of the rest of mode operations are cleared, permits said active module memory switch and said first memory bus switch to be in the enable state, and executes the memory read in the active mode;

in case where the bit values of only the active mode and the standby mode are set and the bit values of the rest of mode operations are cleared, permits said active module memory switch and said first memory bus switch to be in the enable state, and produces the memory write signal to perform the memory write in a non-duplexing mode; and in case where the bit value of only the standby mode is cleared and the bit values of the rest of mode operations are set, permits said active module memory switch and said first memory bus switch to be in the enable state, and executes the memory read in the non-duplexing mode.

6. The device as defined in claim 1, wherein said memory switch controller within said memory switch part is separable from said memory switches and can be individually exchanged with new one.

* * * * *